United States Patent [19]

Messian

[11] 3,757,902
[45] Sept. 11, 1973

[54] COUPLING FOR ROTATIONAL COUPLING OF TWO SUBSTANTIALLY COAXIAL SHAFTS

[75] Inventor: Philippe R. Messian, Saint-Cloud, France

[73] Assignee: Engrenages Et Reducteurs (Engrenages Citroen et Etablissements R. Messian reunis), Velizy-Villacoublay, France

[22] Filed: Oct. 26, 1971

[21] Appl. No.: 192,144

[30] Foreign Application Priority Data
Oct. 27, 1970 France .............................. 7038770

[52] U.S. Cl. .................... 188/71.1, 64/6, 192/70.13, 192/110 S
[51] Int. Cl. ............................................. F16d 55/00
[58] Field of Search ................ 188/73.6, 71.5, 71.1; 192/70.13, 110 S, 110 R; 64/6 R, 31

[56] References Cited
UNITED STATES PATENTS

| | | | |
|---|---|---|---|
| 1,682,444 | 8/1928 | Trumpler .................................. | 64/6 |
| 1,821,127 | 7/1931 | Vandeveer ......................... | 192/110 S |
| 2,426,791 | 9/1947 | Ricketts ............................ | 192/70.13 |
| 3,469,658 | 9/1969 | Forsythe ........................... | 188/73.6 |
| 3,675,744 | 7/1972 | Beller ................................ | 188/73.6 |

Primary Examiner—Charles J. Myhre
Assistant Examiner—Randall Heald
Attorney—Anthony P. DeLio et al.

[57] ABSTRACT

A disc brake assembly comprising: a movable disc brake member and a coupling for rotational coupling of two substantially coaxial shafts, said coupling comprising a first element connected to one shaft, a connecting member releasably connecting the first element to a second element and disposed with radial clearance on at least one of the elements, a spacer member detachably connected to the other shaft and to which the second element is rigidly connected; wherein the disc or calliper of the disc brake member is detachably but rigidly connected to the spacer member, the arrangement being such that the distance between the oppositely directed end surfaces of the second element and spacer member is at the most equal to the distance between the opposed end surfaces of the first element and the other shaft.

7 Claims, 2 Drawing Figures

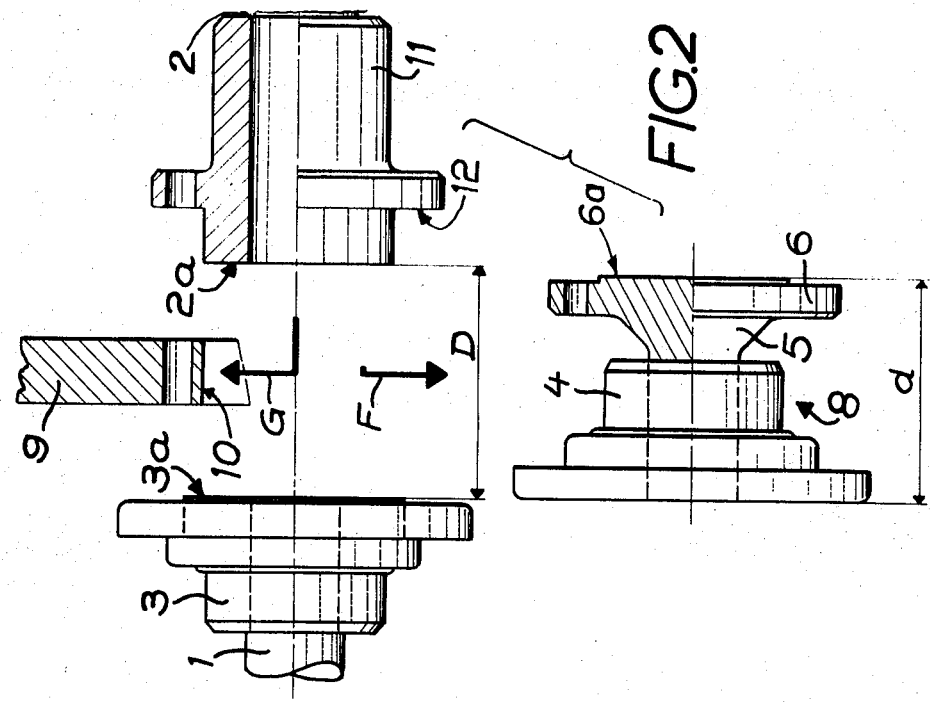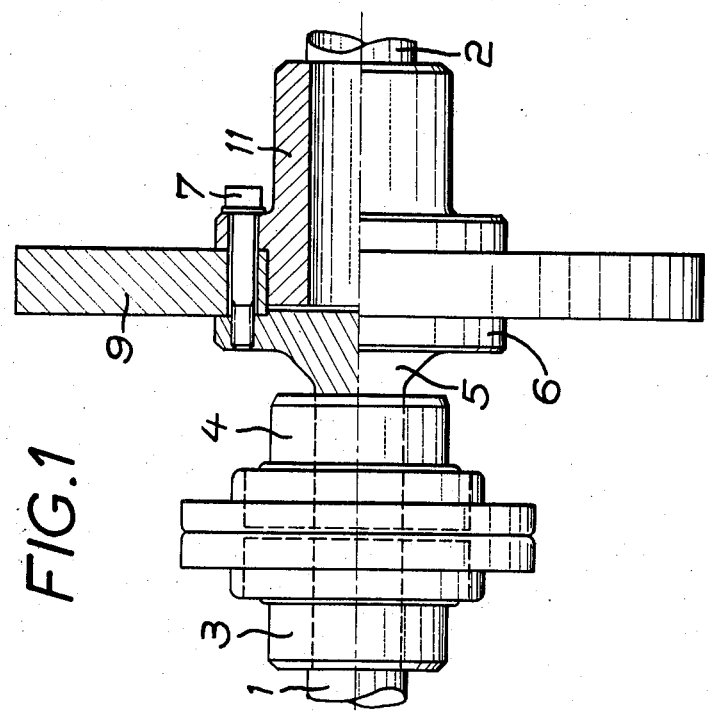

COUPLING FOR ROTATIONAL COUPLING OF TWO SUBSTANTIALLY COAXIAL SHAFTS

Various types of couplings are known whereby two shafts can be coupled for rotation even if they are in only approximate alignment. In such a coupling the two shafts are connected by a connecting member which has freedom to move slightly radially at least with respect to one of the shafts. Any misalignment of the two shafts is thus allowed for during a complete revolution because of the radial clearance provided.

Couplings are also known which include a disc brake, the removable member of such a brake necessarily being rigidly connected for rotation to one of the two shafts, at least in the simplest and most serviceable arrangements.

In one arrangement, the coupling comprises two elements one of which is rigidly connected to one of the shafts and the other to the other shaft, for example by being shrunk on, and a connecting member which may be a drum provided with two sets of teeth or a spring fitted in two sets of grooves or any resilient connecting means. The brake disc is disposed on one of the elements rigidly connected to one of the shafts. Consequently the one element has to be specially constructed so that it can support the disc. Similarly, the casing covering the two elements very frequently is required to be designed to a special configuration.

The resulting construction is expensive because it is impossible to use mass-produced and/or standard couplings because specialised couplings are required. Since this type of coupling comprises elements which are often very large, for example ranging between 1 and 2 metres in diameter, it will readily be apparent that such constructions are disadvantageous.

According to the present invention there is provided a coupling for connecting a driving shaft and a driven shaft for rotation, the two shafts being disposed substantially but not necessarily exactly coaxially in extension one of the other, the coupling comprising:

a first element adapted to be connected to one of the shafts, a second element, a connecting member adapted to connect said first and second elements and to be disposed with radial clearance on at least one of said first and second elements, opposed central end surfaces of said first and second elements being in register with one another, and a spacer member adapted to be detachably connected to the other shaft and to which said second element is rigidly connectable: and wherein the movable member of a disc brake is adapted to be rigidly connected to said spacer member, and wherein, when said coupling is assembled, the distance between said end surface of said second element and the oppositely directed end surface of said spacer member is at a maximum equal to the distance between said end surface of said first element and the end surface of said other shaft.

Advantageously, the brake member is rigidly connected to the spacer member by detachable fixing means.

The movable brake member, the spacer member and the first shaft are preferably rigidly connected by commons fixing means.

Further features and advantages of the present invention will become apparent from the following description of one embodiment thereof, given by way of example only, with reference to the accompanying drawings, in which:

FIG. 1 is a partial section of a fully assembled coupling according to the invention; and FIG. 2 is an exploded view of the coupling shown in FIG. 1.

The coupling shown in FIGS. 1 and 2 connects shafts 1 and 2 for rotation. It can be of standard construction and consists of an element 3 rigidly connected to the shaft 1 and an element 4 rigidly connected to a spacer member 5. The spacer member 5 has a flange 6 by which it is connected to the shaft 2 or an end member 11 on the shaft 2, for example by means of screws 7. A connecting member (not shown but known) connects the two elements 3 and 4 with radial clearance.

The elements 3 and 4 are rigidly connected respectively to the shaft 1 and the spacer member 5 generally, but not necessarily, by means providing non-detachable fixing. For example, the elements 3, 4 may be shrunk on to the shaft 1 and member 5. The distance $d$ between the two end faces of the assembly 8 formed by the element 4 mounted on the spacer member 5, is less than or at maximum equal to the distance $D$ between the central end surface $3a$ of the element 3 in position on the shaft 1, and the end surface $2a$ of the shaft 2 or the member 11 connected thereto.

A disc 9 of a disc brake comprises a central bore 10 whereby the disc can be directly positioned on the shaft 2 or on the member 11 connected thereto in register with an end face of a flange 12 on the shaft 2 or the member 11.

Alternatively, the disc 9 could be interposed between the end surface $6a$ of the flange 6 and the end surface $2a$ of the shaft 2 or member 11.

The disc 9, flange 6 and flange 12 are secured to one another generally by detachable fixing means, which as shown are the single fixing screws 7. Although it is conventional to dispose the disc of a brake on the movable member requiring to be braked, the reverse assembly is also possible.

The arrows F and G each comprising two parts show the respective movements of the assembly 8 and the disc 9 during dismantling.

The advantages of the invention are very simple to explain.

A first examination of the construction will show that the two elements 3 and 4 of the coupling have in no way been modified to allow the disc 9 to be fitted to the coupling. Only the spacer member 5 has been specially made to allow the disc 9 to be adapted to the required assembly. Standard couplings of known types can therefore be used in the present coupling.

The choice of the dimensions $d$ and $D$ and the use of detachable fixing means 7 also allows the disc 9 to be periodically changed without any difficulty, very quickly and without in any way affecting the positions of the shafts 1 and 2.

It is found that the intensive use of disc brakes results in premature disc wear so that the discs have to be periodically replaced. In the present embodiment, replacement of the disc 9 is a very simple matter. Starting with the fully assembled coupling shown in FIG. 1, only the screws 7 and the connecting member which connects the elements 3 and 4 of the coupling have to be removed. As a result of this operation the assembly 8 can be moved in the direction of the arrow F and then the disc 9 can be moved in the direction of the arrow G. The shafts 1 and 2 remain in their operation positions without any need for their movement.

The arrangement has been further simplified by the provision of single fixing screws 7 to connect the disc 9, the flange 6 and the flange 12.

The provision of a spacer member which is of course novel in relation to prior-art couplings is in no way obvious. The provision of the spacer member at first sight appears to complicate existing couplings by the provision of an extra part — the spacer member 5 — and the extra fastening means for fixing this extra part to the shaft 2 or to the member 11 rigidly secured thereto.

However the coupling described above provides an incontrovertible technical advance since it enables couplings of standard sizes to be used and allows the worn movable member of a brake to be changed without any need to move the shafts 1 and 2.

I claim:

1. In a disc brake assembly which includes a movable disc brake member and a coupling for connecting a driving shaft and a driven shaft for rotation of said shafts together, the two shafts being disposed substantially but not necessarily exactly coaxially in extension one of the other, the coupling comprising:
   a plate-like first element adapted to be connected to one of the shafts,
   a plate-like second element,
   a connecting member adapted to connect said first and second elements and to be disposed with radial clearance on at least one of said first and second elements, opposed central end surfaces of said first and second elements being in register with one another, and
   a spacer member adapted to be detachably connected to the other shaft and to which said second element is rigidly connectable,
   said disc brake member adapted to be rigidly connected to said spacer member, and wherein, when said disc brake assembly is assembled, the maximum distance between said end surface of said second element and the oppositely directed end surface of said spacer member is equal to the distance between said end surface of said first element and the end surface of said other shaft.

2. An assembly according to claim 1 including detachable fixing means for rigidly connecting said movable disc brake member to said spacer member.

3. An assembly according to claim 2 wherein said detachable fixing means is adapted to rigidly connect said spacer member to the second shaft.

4. In a disc brake assembly which includes a movable disc brake member and a coupling for connecting a driving shaft and a driven shaft for rotation of said shafts together, the two shafts being disposed substantially but not necessarily exactly coaxially in extension one of the other, said coupling comprising a first element adapted to be connected to one of the shafts, a second element, and a connecting member adapted to connect said first and second elements and to be disposed with radial clearance on at least one of said first and second elements, wherein opposed central end surfaces of said first and second elements are in register with one another,
   the improvement which comprises a spacer member adapted to be detachably connected to the other of said shafts and to which said second element is rigidly connectable, said disc brake member adapted to be rigidly connected to said spacer member, wherein when said disc brake assembly is assembled, the maximum distance between said end surface of said second element and the oppositely directed end surface of said spacer member is equal to the distance between said end surface of said first element and the end surface of said other shaft.

5. An assembly according to claim 4 wherein said first and second elements are plate-like.

6. An assembly according to claim 4 including detachable fixing means for rigidly connecting said movable disc brake member to said spacer member.

7. An assembly according to claim 6 wherein said detachable fixing means is adapted to rigidly connect said spacer member to the second shaft.

* * * * *